US012346198B2

United States Patent
Erickson et al.

(10) Patent No.: US 12,346,198 B2
(45) Date of Patent: Jul. 1, 2025

(54) SELECTABLE MULTI-STAGE ERROR DETECTION AND CORRECTION

(71) Applicant: Rambus Inc., San Jose, CA (US)

(72) Inventors: Evan Lawrence Erickson, Chapel Hill, NC (US); John Eric Linstadt, Palo Alto, CA (US)

(73) Assignee: Rambus Inc., San Jose, CA (US)

( * ) Notice: Subject to any disclaimer, the term of this patent is extended or adjusted under 35 U.S.C. 154(b) by 206 days.

(21) Appl. No.: 18/213,828

(22) Filed: Jun. 24, 2023

(65) Prior Publication Data
US 2024/0012710 A1   Jan. 11, 2024

Related U.S. Application Data

(60) Provisional application No. 63/425,657, filed on Nov. 15, 2022, provisional application No. 63/358,947, filed on Jul. 7, 2022.

(51) Int. Cl.
  *G06F 11/10*   (2006.01)
(52) U.S. Cl.
  CPC .................................. *G06F 11/10* (2013.01)
(58) Field of Classification Search
  CPC ...................................................... G06F 11/10
  See application file for complete search history.

(56) References Cited

U.S. PATENT DOCUMENTS

| 2014/0047265 | A1* | 2/2014 | Das | G06F 11/1666 714/54 |
| 2019/0317856 | A1* | 10/2019 | O'Connor, Jr. | G06F 3/0619 |
| 2023/0401311 | A1* | 12/2023 | Erickson | G06F 21/79 |
| 2024/0061741 | A1* | 2/2024 | Agarwal | G11C 29/10 |

OTHER PUBLICATIONS

A. Fakhrzadehgan et al. "SafeGuard: Reducing the Security Risk from Row-Hammer via Low-Cost Integrity Protection," 2022 IEEE International Symposium on High-Performance Computer Architecture (HPCA), Seoul, Korea, Republic of, 2022, pp. 373-386, (Year: 2022).*
Chen, Hsing-Min et al., "Configurable-ECC: Architecting a Flexible ECC Scheme to Support Different Sized Accesses in High Bandwidth Memory Systems", IEEE Transactions on Computers, vol. 68, No. 5, May 2019. 14 pages.

* cited by examiner

*Primary Examiner* — Cynthia Britt
(74) *Attorney, Agent, or Firm* — The Neudeck Law Firm, LLC

(57) ABSTRACT

When writing a block (e.g., cache line) of data to a memory, error detection and correction (EDC) information (check) symbols are calculated. The block of data, a first portion of the check symbols, and metadata are all written concurrently at a first address. The remaining portion of the check symbols are written at a second, different from the first, address. When reading the block of data, a first read command accesses the block of data, the first portion of the check symbols, and the metadata from the first address. Only the first portion of the check symbols is used to determine a first number of errors (if any) in the accessed data. If the first number of errors meets a threshold number of errors, a second read command is issued to access the second portion of the check symbols.

20 Claims, 9 Drawing Sheets

CONCURRENTLY RECEIVE, VIA A MEMORY CHANNEL INTERFACE AND FROM AT LEAST A FIRST MEMORY COMPONENT, A FIRST CACHE LINE OF DATA, A FIRST BLOCK OF METADATA, AND A FIRST SET OF CHECK SYMBOLS IN RESPONSE TO A FIRST READ COMMAND TRANSMITTED BY A MEMORY BUFFER DEVICE
202

DETERMINE A FIRST NUMBER OF ERRORS PRESENT IN THE FIRST CACHE LINE OF DATA, THE FIRST BLOCK OF METADATA, AND THE FIRST SET OF CHECK SYMBOLS
204

BASED ON THE FIRST NUMBER OF ERRORS MEETING A FIRST THRESHOLD NUMBER, TRANSMITTING, BY THE MEMORY BUFFER DEVICE, A SECOND READ COMMAND TO AT LEAST THE FIRST MEMORY COMPONENT
206

RECEIVE, IN RESPONSE TO THE SECOND READ COMMAND, A SECOND SET OF CHECK SYMBOLS
208

CORRECT, USING AT LEAST THE SECOND SET OF CHECK SYMBOLS, ERRORS PRESENT IN THE FIRST CACHE LINE OF DATA, THE FIRST BLOCK OF METADATA, THE FIRST SET OF CHECK SYMBOLS, AND THE SECOND SET OF CHECK SYMBOLS.
210

*FIG. 2*

CONCURRENTLY RECEIVE, VIA A MEMORY CHANNEL INTERFACE AND FROM AT LEAST A FIRST MEMORY COMPONENT, A FIRST CACHE LINE OF DATA, A FIRST BLOCK OF METADATA, A FIRST AUTHENTICATION CODE, AND A FIRST SET OF CHECK SYMBOLS IN RESPONSE TO A FIRST READ COMMAND TRANSMITTED BY THE MEMORY BUFFER DEVICE
602

DETERMINE A FIRST NUMBER OF ERRORS PRESENT IN THE FIRST CACHE LINE OF DATA, THE FIRST BLOCK OF METADATA, THE AUTHENTICATION CODE, AND THE FIRST SET OF CHECK SYMBOLS
604

BASED ON THE FIRST NUMBER OF ERRORS NOT MEETING A FIRST THRESHOLD NUMBER, DETERMINE WHETHER THE AUTHENTICATION CODE AND THE FIRST CACHE LINE OF DATA MEET AN AUTHENTICATION CRITERIA
606

BASED ON THE AUTHENTICATION CODE AND THE FIRST CACHE LINE OF DATA NOT MEETING THE AUTHENTICATION CRITERIA, TRANSMITTING, BY THE MEMORY BUFFER DEVICE, A SECOND READ COMMAND TO AT LEAST THE FIRST MEMORY COMPONENT
608

RECEIVE, IN RESPONSE TO THE SECOND READ COMMAND, A SECOND SET OF CHECK SYMBOLS
610

CORRECT, USING AT LEAST THE SECOND SET OF CHECK SYMBOLS, ERRORS PRESENT IN THE FIRST CACHE LINE OF DATA, THE FIRST BLOCK OF METADATA, THE AUTHENTICATION CODE, THE FIRST SET OF CHECK SYMBOLS, AND THE SECOND SET OF CHECK SYMBOLS.
612

*FIG. 6*

SELECTABLE MULTI-STAGE ERROR DETECTION AND CORRECTION

BRIEF DESCRIPTION OF THE DRAWINGS

FIG. 2 is a flowchart illustrating a method of operating a memory system.

FIG. 6 is a flowchart illustrating a method of operating a memory system that stores authentication codes.

DETAILED DESCRIPTION OF THE EMBODIMENTS

Figure 1:
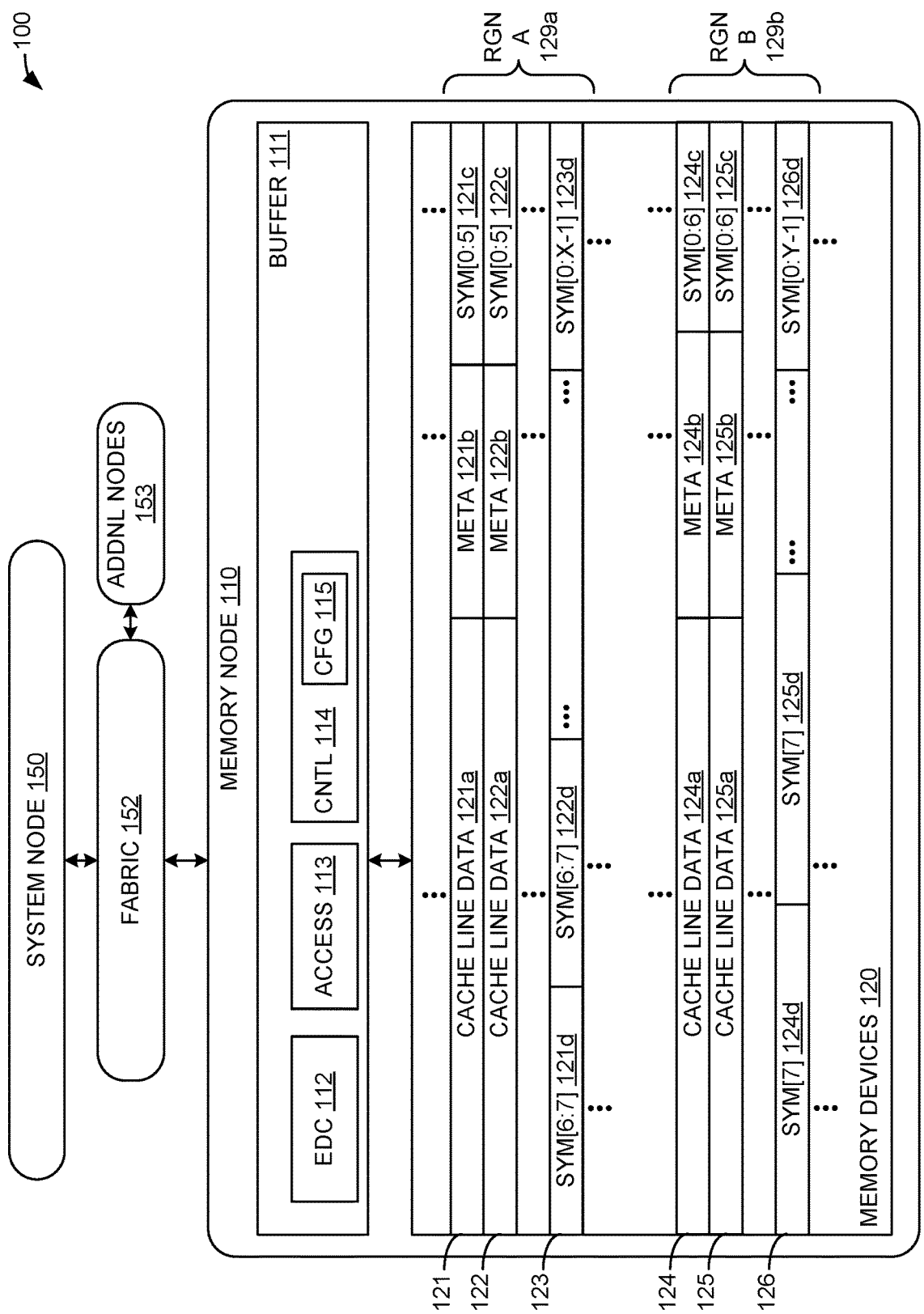
FIG. 1 is a block diagram illustrating a memory system.

In an embodiment, metadata associated with a block of data (e.g., cache line) is stored both "in-band" and "side-band". The terms "side-band" and "in-band" relate the location of metadata with respect to the location of the associated block of data. Side-band metadata is metadata stored alongside cache line data and accessed using the same address and possibly same command. In-band metadata is stored at a different address than the block of data. As used herein, metadata is any additional data associated with a block of data and may include error detection and correction (EDC) information symbols (a.k.a., check symbols). However, as used herein for clarity, EDC information symbols will not be referred to as part of the metadata. Rather, the check symbols will be referred to as separate from the rest of the metadata. Examples of information conveyed/stored as metadata include host-controlled metadata (e.g. coherency data), device-controlled metadata (poison/valid flags for the cache line, memory authentication codes, etc.).

In an embodiment, when writing a cache line of data to memory, a first number of error detection and correction (EDC) information symbols (a.k.a., check symbols) are calculated in order to provide a specified level of error resiliency (e.g., protection from any single memory chip failure as well as multi-bit errors from any portion of a single memory chip). A first portion (i.e., set) of the check symbols, the metadata, and cache line are all written concurrently at a first address. In other words, the first portion of the check symbols and the metadata are stored "side-band" relative to the cache line. The remaining (second) portion of the check symbols is written using a second command and at a second, different from the first, address. Thus, the remaining portion of the check symbols (and possibly additional metadata) is termed as being stored "in-band" (i.e., at a different address than the associated cache line.)

In an embodiment, when reading the cache line, a first read command accesses the cache line, the first portion of the check symbols (side-band), and the metadata (side-band). Only the first portion of the check symbols is used to determine a first number of errors (if any) in the accessed cache line, check symbols, and metadata. If the first number of errors equals or exceeds a threshold (i.e., meets the threshold number of errors), a second read command is issued to access the second portion of the check symbols (in-band). After receiving the second portion of the check symbols, the full set of EDC symbols may be used to correct and/or detect errors. Thus, it should be understood that when the first, partial set, of check symbols determines there are fewer errors than the threshold, only a single read access may be performed rather than requiring two read accesses to access the full set of EDC check symbols each time a cache line is read—thereby reducing the overall number of read accesses performed by a system.

In an embodiment, the number of check symbols in the first and second portions, and the size of the metadata are configurable by memory region (e.g., segments, pages). This allows different processes, hosts, and/or virtual machines to use different metadata sizes and/or have different amounts of EDC protection on the first access. In an embodiment, the metadata includes a message authentication code (MAC). These MACs may be used in conjunction with the first portion of check symbols to improve the error detection ability provided for the first access.

FIG. 1 is a block diagram illustrating a memory system. In FIG. 1, system 100 comprises system node 150, fabric 152, additional nodes 153, and memory node 110. Memory node 110 includes buffer device 111, and memory devices 120. The contents residing in memory devices 120 includes memory region "A" 129a and memory region "B" 129b. Memory regions 129a-129b represent address ranges (e.g., pages, segments, allocations, etc.) of memory that are, within the region 129a-129b, configured to use the same or similar error detection and correction scheme and metadata fields. Accordingly, region A 129a is illustrated with access locations/words 121-123 (e.g., 640-bit words). Word 121 is illustrated as storing cache line data 121a, associated metadata 121b, and associated EDC symbols SYM[0:5] 121c. Word 122 is illustrated as storing data for cache line data 122a, associated metadata 122b, and associated EDC symbols SYM[0:5] 122c. Word 123 is illustrated storing additional EDC symbols SYM[6:7] 121d-122d respectively associated with each of a first number (e.g., N) of words 121-122 in region A 129a that are each at least storing cache line data 121a-122a and metadata 121b-122b. Word 123 also includes X number of EDC symbols SYM[0:X−1] 123d to protect the additional EDC symbols SYM[6:7] 121d-122d (and any additional metadata, if present, in word 123). "X" is a number selected to provide the desired error resiliency for word 123 and may vary and/or be configured by region. Region B 129b is illustrated with access locations/words 124-126. Word 124 is illustrated as storing cache line data 124a, associated metadata 124b, and associated EDC symbols SYM[0:6] 124c. Word 125 is illustrated as storing cache line data 125a, associated metadata 125b, and an associated EDC symbols SYM[0:6] 125c. Word 126 is illustrated storing an additional EDC symbols SYM[7] 124d-125d respectively associated with each of a second number (e.g., M) of words 124-125 in region B 129b that are each at least storing cache line data 124a-125a and metadata 124b-125b. Word 126 also includes Y number of EDC symbols SYM[0:Y−1] 126d to protect the additional EDC symbols SYM[7] 121d-122d (and any additional metadata, if present, in word 126). "Y" is a number selected to provide the desired error resiliency for word 126 and may vary and/or be configured by region.

System node 150, memory node 110, and additional nodes 153 are operatively coupled to fabric 152. System node 150, memory node 110, and additional nodes 153 are operatively coupled to fabric 152 to communicate and/or exchange information etc. with each other. Fabric 152 may be or comprise a switched fabric, point-to-point connections, and/ or other interconnect architectures (e.g., ring topologies, crossbars, etc.). Fabric 152 may include links, linking, and/or protocols that are configured to be cache coherent. For example, fabric 152 may use links, linking, and/or protocols that include functionality described by and/or are compatible with one or more of Compute Express Link (CXL), Coherent Accelerator Processor Interface (CAPI), and Gen-Z standards, or the like. In an embodiment, system node 150, memory node 110, and additional nodes 153 are operatively coupled to fabric 152 to request and/or store information from/to that resides within other of system node 150, memory node 110, and/or additional nodes 153. In an embodiment, additional nodes 153 may include similar or the same elements as system node 150, and/or memory node 110 and are therefore, for the sake of brevity, not discussed further herein with reference to FIG. 1.

In an embodiment, buffer device 111 includes error detection and correction (EDC) circuitry 112 (hereinafter, "EDC circuitry 112"), access circuitry 113, and control circuitry 114. Control circuitry 114 may include configuration information 115. Access circuitry 113 is operatively coupled to memory devices 120. Access circuitry 113 is configured to access at least one of memory devices 120 to access at least words 121-126 stored by memory devices 120. In an embodiment, buffer device 111 may be, or comprise, a processor running a real-time operating system.

Memory node 110 (and buffer device 111, in particular) is operatively coupled to fabric 152 to receive, from system node 150, access requests (e.g., reads and writes). Access requests transmitted by system node 150 may include read requests (e.g., to read a block of data comprising a cache line data 121a and associated metadata 121b) and write requests (e.g., to write a block of data comprising a cache line data 121a and associated metadata 121b). In an embodiment, to respond to a read or write request, buffer device 111 may perform a page table walk to relate the address received from system node 150 to a physical address that is used by memory devices 120 (e.g., to address word in one of region A 129a or region B 129b).

Buffer 110 and memory devices 120 may be, or comprise, integrated circuit type devices, such as those commonly referred to as "chips". A memory buffer, such as buffer 111, manages the flow of data going to and from memory devices 120 and fabric 152. Functionality of buffer 111 may be included on a single die, multiple dies, or included as part of a more complex integrated circuit system as a block of a system on a chip (SOC).

In an embodiment, when writing a cache line and associated metadata to memory devices 120, buffer 111 (and EDC circuitry 112, in particular) calculates a set of check symbols in order to provide a specified level of error resiliency. Buffer 111 writes a first portion (i.e., not all) of the generated check symbols (e.g., check symbols SYM[0:5] 121c), the cache line (e.g., cache line data 121a), and associated metadata (e.g., metadata 121b) concurrently to memory devices 120 at a first address (e.g., word 121). Thus, the first portion of the generated check symbols (e.g., check symbols SYM[0:5] 121c), the metadata (e.g., metadata 121b), and the cache line sized block of data (e.g., cache line data 121a) are all written concurrently at a first address. In other words, the first portion of the check symbols and the metadata are stored "side-band" relative to the cache line. Buffer 111 writes the remaining (second) portion of the generated check symbols (e.g., check symbols SYM[6:7] 121d) using a second command and at a second, different from the first, address. Thus, the second portion of the check symbols (and possibly additional metadata) is termed as being stored "in-band" (i.e., at a different address than the associated cache line.)

In an embodiment, when reading the block of data, buffer 111 issues a first read command to memory devices 120 that accesses the cache line (e.g., cache line data 121a), the first portion (e.g., check symbols SYM[0:5]) of the full set of check symbols, and the metadata (e.g., metadata 121b) stored side-band. Only the first portion (e.g., check symbols SYM[0:5]) of the check symbols is used to determine a first number of errors (if any) in the accessed word (e.g., word 121). If the first number of errors equals or exceeds a threshold, buffer device 111 issues a second read command to access the second portion (e.g., check symbols SYM[6:7] 121d) of the check symbols stored in-band. After receiving the second portion of the check symbols, buffer device 111 uses the full set of EDC symbols (e.g., eight check symbols SYM[0:7]) to correct and/or detect errors. Thus, when buffer device 111 determines, using just the first, partial set, of check symbols (e.g., check symbols SYM[0:5]), that there are fewer errors than the threshold, buffer device 111 may perform only a single read access rather than requiring two read accesses (e.g., first to word 121 and then to word 123) to access the full set of EDC check symbols each time a cache line and associated metadata is read—thereby reducing the overall number of read accesses performed by a system.

In an embodiment, the number of check symbols in the first and second portions and the size of the metadata written and read by buffer 111 are configurable (e.g., by using configuration information 115) by memory region 129a-129b. This is illustrated in FIG. 1 by words 124-125 in region B 129b having a different number of check symbols (e.g., check symbols SYM[0:6] 124c) than words 121-122 in region A 129a. This configurability allows different processes, system nodes, and/or virtual machines to use different metadata sizes and/or have different amounts of EDC protection on the first access to memory device 120.

In an embodiment, EDC circuitry 112 generates a first set of check symbols (e.g., check symbols SYM[0:5] 122c and check symbols SYM[6:7] 122d) for a first block of data (e.g., cache line data 122a) and a first block of metadata (e.g., metadata 122b). Buffer 111 divides the first set of check symbols into a first proper subset of the first set of check symbols (e.g., check symbols SYM[0:5] 122c) and a second proper subset of the first set of check symbols (e.g., check symbols SYM[6:7] 122d). Note that in some embodiments, the sets buffer 111 divides the check symbols into may not be "proper" subsets (i.e., they may be overlapping subsets). Buffer 111 then concurrently writes, using a first access, the first block of data and the first proper subset of check symbols to memory devices 120 (e.g., at word 121). Buffer 111 also writes the second proper subset of check symbols to memory devices 120 (e.g., at word 123) using a different access (i.e., write command and location).

At some point, buffer 111 concurrently accesses, from memory devices 120, the first block of data and the first proper subset (e.g., from word 121 and via a first word-wide memory channel—not shown in FIG. 1) to obtain a received version of the first block of data, a received version of the first block of metadata, and a received version of the first proper subset.

EDC circuitry 112 of buffer 111 uses the received version of the first proper subset (e.g., check symbols SYM[0:5] 122c) to detect a first number of errors in the received version of the first block of data, the received version of the first proper subset, and the received version of the first block of metadata. Based on the first number of errors meeting (e.g., equals or exceeds) a first threshold criteria (e.g., 4 or more symbol errors detected, 3 or more symbol errors detected, etc.—configurable using, e.g., configuration information 115), buffer 111 accesses the second proper subset at a location (e.g., word 122) that is in-band with at least one of the first block of data, the first proper subset, and the first block of metadata, to receive a received version of the second proper subset (e.g., check symbols SYM[6:7] 122d). Also based on the first number of errors meeting the first threshold criteria, the EDC circuitry 112 uses the received version of the first proper subset and the received version of the second proper subset to detect a second number of errors in the received version of the first block of data, the received version of the first proper subset, the received version of the second proper subset, and the received version of the first block of metadata.

In an embodiment, the number of symbols in the first and second proper subsets, the size of the block of metadata, and the threshold number of errors that result in a second access to retrieve the second proper subset of check symbols are configurable (e.g., using configuration information 115). Table 1 illustrates examples of configurations for a system (or region 129a-129b) using 16-bit symbols and a 640-bit word (i.e., 8 side-band stored cache line check symbols).

TABLE 1

| EDC scheme | Meta-data size | Number of side-band ($1^{st}$ subset) EDC symbols | Side-band only ($1^{st}$ subset) EDC capability | Errors present threshold | Side-band only EDC ($1^{st}$ subset) un-detectable error probability estimate | Number of in-band ($2^{nd}$ subset) EDC symbols |
|---|---|---|---|---|---|---|
| RS (40, 32) | 0-bits | 8 | detect and correct 4 symbols | n/a | ~$10^{-15}$ | n/a |
| RS (41, 33) | 16-bits | 7 | correct 3 symbols; detect 4 symbols | 3 symbols corrected | ~$10^{-15}$ | 1 |
| RS (42, 34) | 32-bits | 6 | detect and correct 3 symbols | 2 symbols corrected | ~$10^{-11}$ | 2 |

FIG. 2 is a flowchart illustrating a method of operating a memory system. One or more steps illustrated in FIG. 2 may be performed by, for example, system 100 and/or its components. Via a memory channel interface and from at least a first memory component, a first cache line of data, a first block of metadata, and a first set of check symbols are concurrently received in response to a first read command transmitted by a memory buffer device (202). For example, memory buffer device 111 may concurrently receive and from memory devices 120 and via a memory channel interface of buffer 111, cache line data 121a, metadata 121b, and check symbols SYM[0:5] 121c in response to a read command addressed to word 121 transmitted by buffer 111.

A first number of errors present in the first cache line of data, first block of metadata, and the first set of check symbols is determined (204). For example, using just check symbols SYM[0:5] 121c EDC circuitry 112 may determine how many, if any, errors are present in the cache line data 121a, metadata 121b, and check symbols SYM[0:5] 121c received in response to the read command addressed to word 121. Based on the first number of errors meeting a first threshold number and by the memory buffer device, a second read command is transmitted to at least the first memory component (206). For example, based on the number of errors present in the cache line data 121a, metadata 121b, and check symbols SYM[0:5] 121c meeting a threshold (e.g., three or more errors corrected, etc.) number of errors, a second read command is transmitted to memory devices 120 in order to read word 123 where check symbols SYM[6:7] 121d are stored.

In response to the second read command, a second set of check symbols are received (208). For example, in response to the read of word 123, buffer 111 may receive check symbols SYM[6:7] 121d. Using at least the second set of check symbols, errors present in the first cache line of data, the first block of metadata, the first set of check symbols, and the second set of check symbols are corrected (210). For example, using check symbols SYM[6:7] 121d and check symbols SYM[0:5] 121c, EDC circuitry 112 may correct one or more errors present in one or more of cache line data 121a, metadata 121b, check symbols SYM[0:5] 121c, and check symbols SYM[6:7] 121d.

Figure 3:
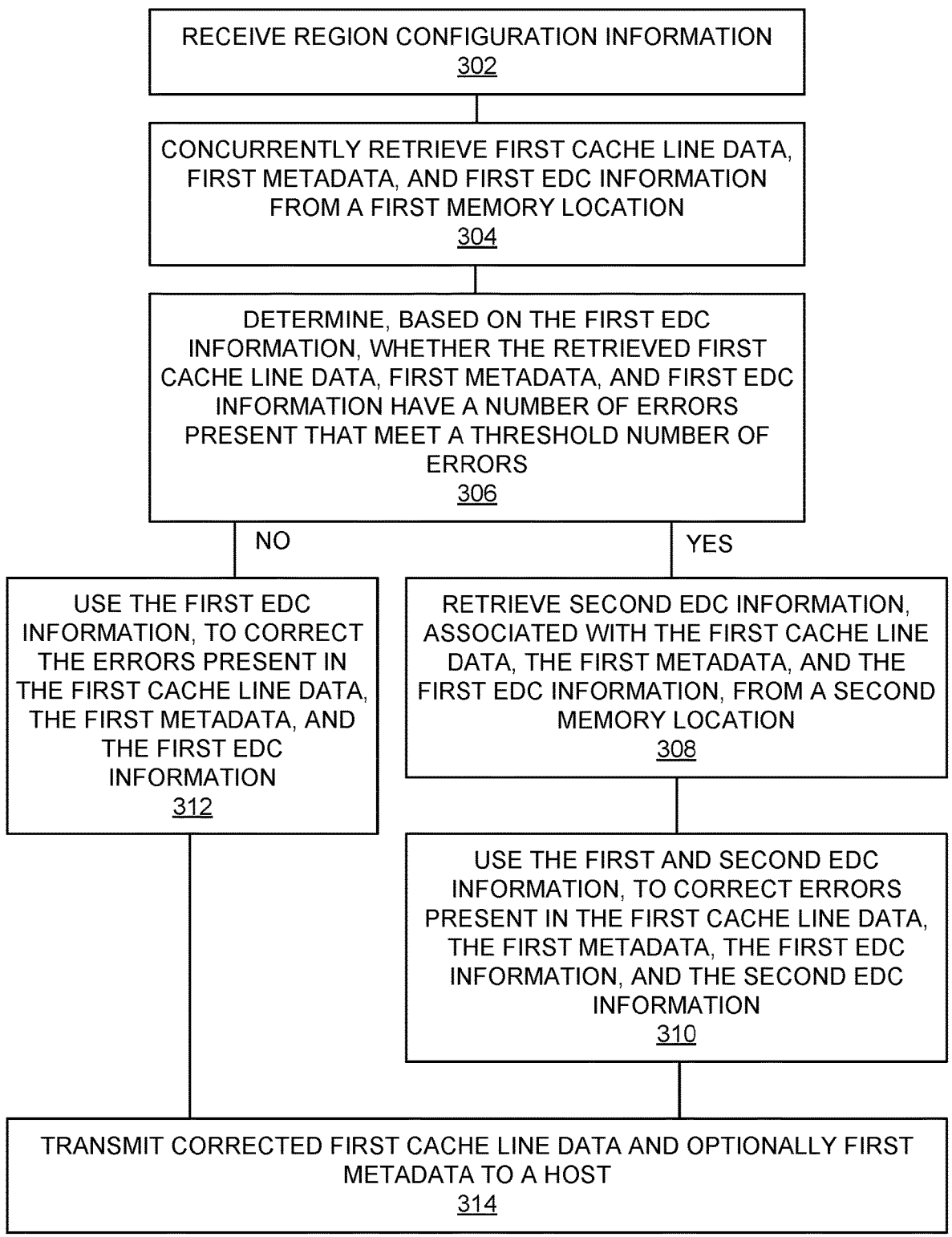
FIG. 3 is a flowchart illustrating a method of detecting and correcting errors.

FIG. 3 is a flowchart illustrating a method of detecting and correcting errors. One or more steps illustrated in FIG. 3 may be performed by, for example, system 100 and/or its components. Region configuration information is received (302). For example, system node 150 may configure configuration information 115 of buffer 111 so that region A 129a has six side-band check symbols (e.g., check symbols SYM[0:5] 120c) and 32-bits of metadata (e.g., metadata 120b) and region B 129b has seven side-band check symbols (e.g., check symbols SYM[0:6] 124c) and 16-bits of metadata (e.g., metadata 124b). See Table 1 for other example side-band/in-band region configurations.

Concurrently retrieve first cache line data, first metadata, and first EDC information from a first memory location (304). For example, buffer 111 may use access circuitry 113 to retrieve cache line data 121a, metadata 121b, and check symbols SYM[0:5] 121c from word 121. Based on the first EDC information, determine whether the retrieved first cache line data, first metadata, and first EDC information have a number of errors present that meet a threshold number of errors. If the number of errors meets the threshold, flow proceeds to box 308. If the number of errors does not meet the threshold, flow proceeds to box 312 (306). For example, buffer 111, using EDC circuitry 112, may determine whether the retrieved versions of cache line data 121a, metadata 121b, and check symbols SYM[0:5] 121c have a number of errors that meets or exceeds a configured threshold number of errors (e.g., three or more symbols corrected).

In box 308, second EDC information associated with the cache line data, first metadata, and the first EDC information is retrieved from a second memory location (308). For example, if the retrieved versions of cache line data 121a, metadata 121b, and check symbols SYM[0:5] 121c meets or exceeds the configured threshold number of errors, buffer 111 may retrieve word 123 in order to receive check symbols SYM[6:7] 121d that are associated with cache line data 121a, metadata 121b, and check symbols SYM[0:5] 121c.

The first and second EDC information is used to correct errors present in the first cache line data, the first metadata, the first EDC information, and the second EDC information (310). For example, EDC circuitry 112 may use check symbols SYM[0:5] 121c and check symbols SYM[6:7] 121d to correct one or more errors present in one or more of cache line data 121a, metadata 121b, check symbols SYM[0:5] 121c, and check symbols SYM[6:7] 121c. The corrected first cache line data and optionally first metadata is transmitted to a host (314). For example, after correcting one or more errors present in one or more of cache line data 121*a*, metadata 121*b*, check symbols SYM[0:5] 121*c*, and check symbols SYM[6:7] 121*c*, buffer 111 may transmit corrected versions of cache line data 121*a* and metadata 121*b* to system node 150. In another example, after correcting one or more errors present in one or more of cache line data 121*a*, metadata 121*b*, check symbols SYM[0:5] 121*c*, and check symbols SYM[6:7] 121*c*, buffer 111 may transmit corrected versions of cache line data 121*a* and a portion of (or none of) metadata 121*b* to system node 150.

In box 312, the first EDC information is used to correct errors present in the first cache line data, first metadata, and the first EDC information (312). For example, if the retrieved versions of cache line data 121*a*, metadata 121*b*, and check symbols SYM[0:5] 121*c* did not meet the configured threshold number of errors, EDC circuitry 112 may use just check symbols SYM[0:5] 121*c* to correct one or more errors present in one or more of cache line data 121*a*, metadata 121*b*, and check symbols SYM[0:5] 121*c*. Flow then proceeds to box 314. For example, after correcting one or more errors present in one or more of cache line data 121*a*, metadata 121*b*, and check symbols SYM[0:5] 121*c* using just check symbols SYM[0:5] 121*c*, buffer 111 may transmit corrected versions of cache line data 121*a* and metadata 121*b* to system node 150.

Figure 4:
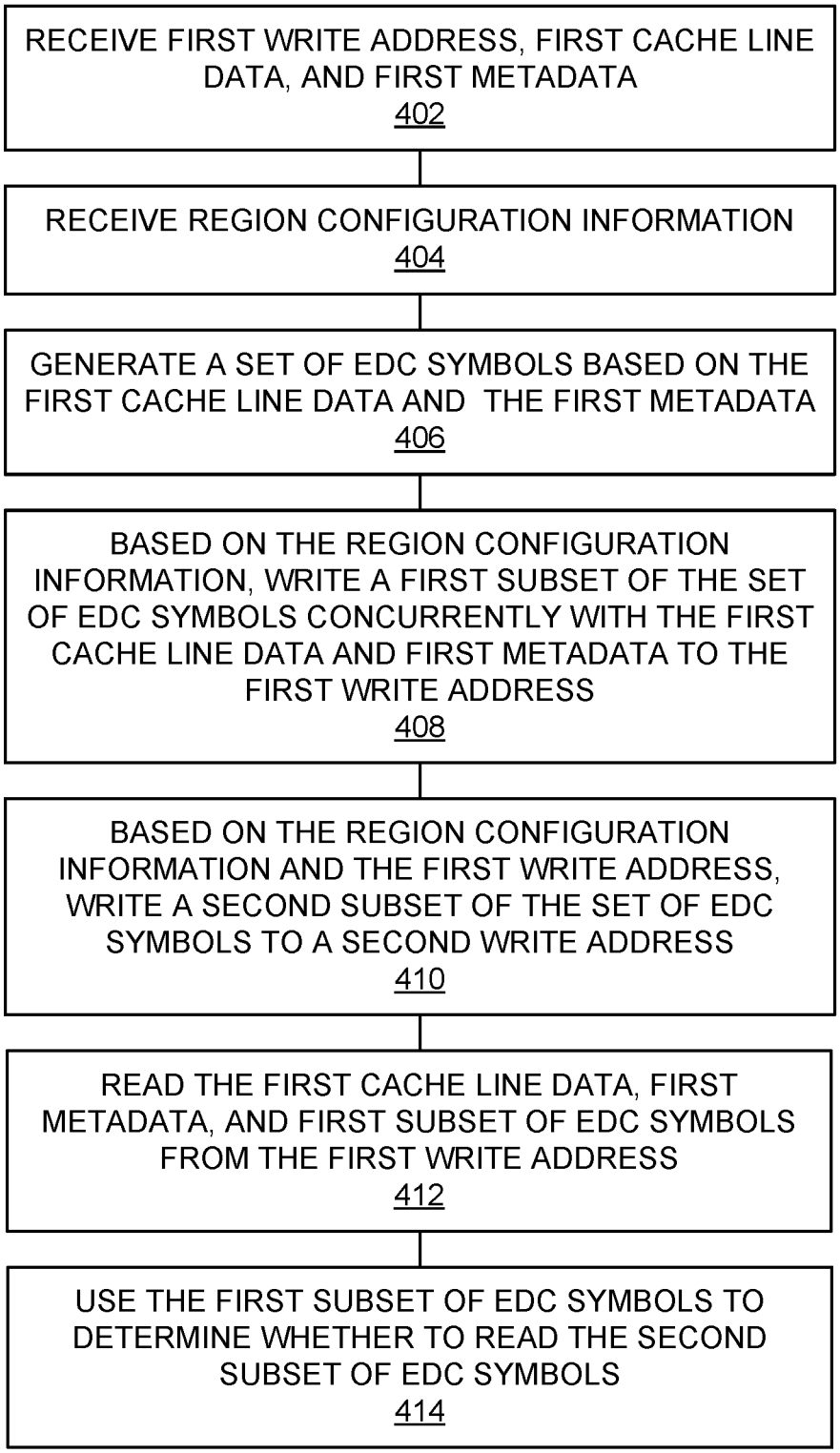
FIG. 4 is a flowchart illustrating a method of reading and writing error detection information.

FIG. 4 is a flowchart illustrating a method of reading and writing error detection information. One or more steps illustrated in FIG. 4 may be performed by, for example, system 100 and/or its components. A first write address, first cache line data, and first metadata are received (402). For example, buffer 111 may receive, from system node 150, cache line data 121*a* in association with metadata 121*b* to be written to word 121.

Region configuration information is received (404). For example, based on word 121 being in region A 129*a*, control circuitry 114 may receive, from configuration information 115, indicators that region A 129*a* has six check symbols stored side-band (e.g., check symbols SYM[0:5] 121*c*) and 32-bits of metadata (e.g., metadata 121*b*). A set of EDC symbols based on the first cache line data and the first metadata is generated (406). For example, EDC circuitry 112 may, based on cache line data 121*a* and metadata 121*b*, generate check symbols SYM[0:5] 121*c* and check symbols SYM[6:7] 123*b*.

Based on the region configuration information, a first subset of the set of EDC symbols is written concurrently with the first cache line data and first metadata to the first write address (408). For example, based on the information that region A 129*a* is to have six check symbols stored side-band and 32-bits of metadata, buffer 111 (and access circuitry 113, in particular) may concurrently write cache line data 121*a*, metadata 121*b*, and check symbols SYM[0:5] 121*c* to word 121. Based on the region configuration information and the first write address, a second subset of the set of EDC symbols is written to a second write address (410). For example, based on the information that region A 129*a* is to have six check symbols side-band and 32-bits of metadata, configuration information that indicates word 123 is to store check symbols SYM[6:7] 123*a*, and the write address of word 121 indicating the location of check symbols SYM[6:7] 123*a* in word 123, buffer 111 may write check symbols SYM[6:7] 123*a* to a location in word 123.

The first cache line data, first metadata, and first subset of EDC symbols is read from the first write address (412). For example, in response to a read transaction from system node 150, buffer 111 may read word 121 to receive cache line data 121*a*, metadata 121*b*, and check symbols SYM[0:5] 121*c*.

The first subset of EDC symbols is used to determine whether to read the second subset of EDC symbols (414). For example, buffer 111, using EDC circuitry 112, may determine whether the retrieved versions of cache line data 121*a*, metadata 121*b*, and check symbols SYM[0:5] 121*c* have enough errors (e.g., meet or exceed a threshold) to warrant retrieving check symbols SYM[6:7] 123*b* from word 123.

Figure 5:
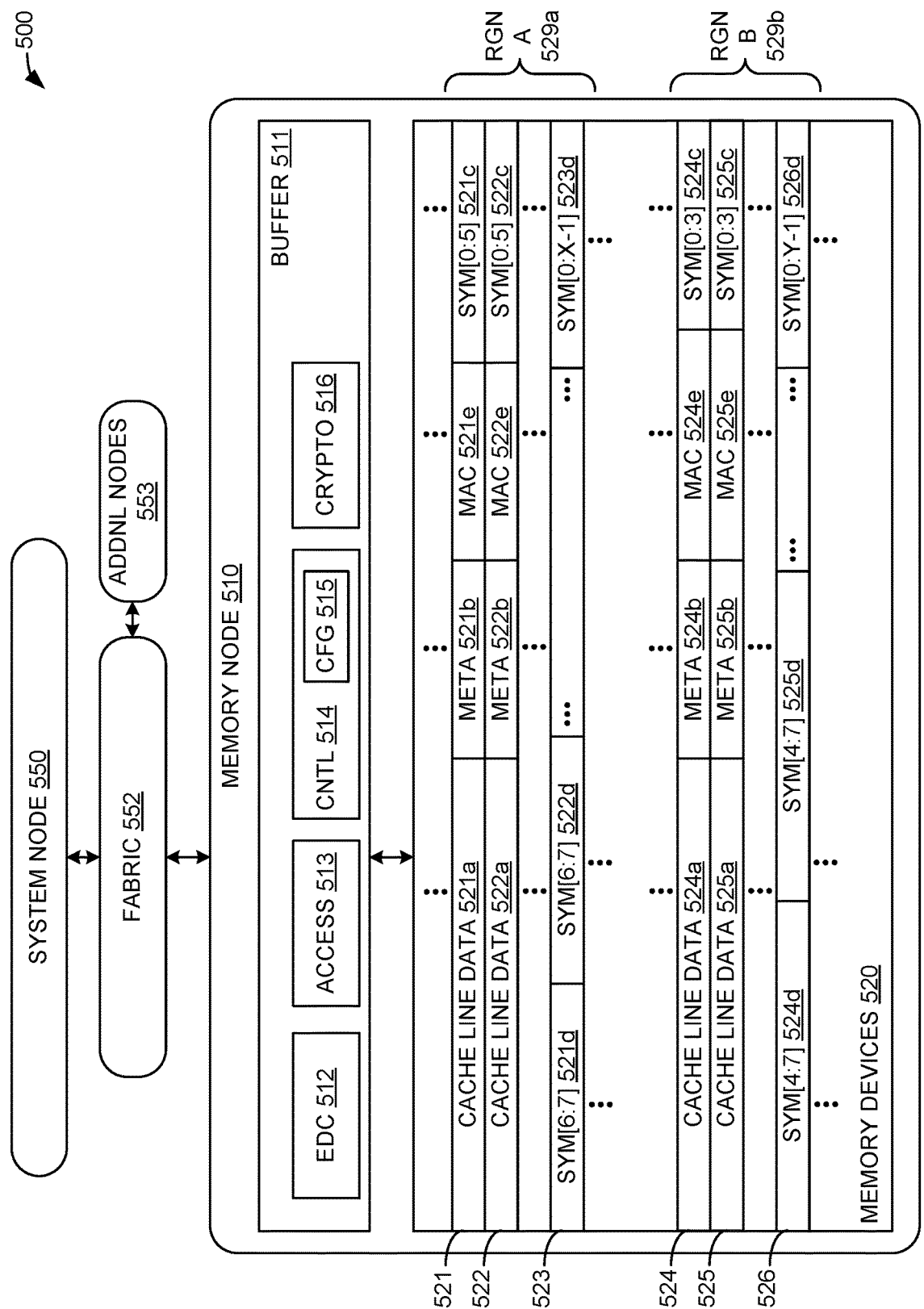
FIG. 5 is a block diagram illustrating a memory system.

FIG. 5 is a block diagram illustrating a memory system. In FIG. 5, system 500 comprises system node 550, fabric 552, additional nodes 553, and memory node 510. Memory node 510 includes buffer device 511, and memory devices 520. The contents residing in memory devices 520 includes memory region "A" 529*a* and memory region "B" 529*b*. Memory regions 529*a*-529*b* represent address ranges (e.g., pages, segments, allocations, etc.) of memory that are, within the region 529*a*-529*b*, configured to use the same or similar error detection and correction scheme and metadata fields. Accordingly, region A 529*a* is illustrated with access locations/words 521-523 (e.g., 640-bit words). Word 521 is illustrated as storing cache line data 521*a*, associated metadata 521*b*, associated memory authentication code (MAC) 521*e*, and associated EDC symbols SYM[0:5] 521*c*. Word 522 is illustrated as storing data for cache line 522*a*, associated metadata 522*b*, associated MAC 522*e*, and associated EDC symbols SYM[0:5] 522*c*. Word 523 is illustrated storing additional EDC symbols SYM[6:7] 521*d*-522*d* respectively associated with each of a first number (e.g., N) of words 521-522 in region A 529*a* that are each at least storing cache line data 521*a*-522*a* and metadata 521*b*-522*b*. Word 523 also includes X number of EDC symbols SYM[0:X−1] 523*d* to protect the additional EDC symbols SYM[6:7] 521*d*-522*d* (and any additional metadata, if present, in word 523). "X" is a number selected to provide the desired error resiliency for word 523 and may vary and/or be configured by region. Region B 529*b* is illustrated with access locations/words 524-526. Word 524 is illustrated as storing cache line data 524*a*, associated metadata 524*b*, and associated EDC symbols SYM[0:3] 524*c*. Word 525 is illustrated as storing cache line data 525*a*, associated metadata 525*b*, and associated EDC symbols SYM[0:3] 525*c*. Word 526 is illustrated storing additional EDC symbols SYM[4:7] 524*d*-525*d* respectively associated with each of a second number (e.g., M) of words 524-525 in region B 529*b* that are each at least storing cache line data 524*a*-525*a* and metadata 524*b*-525*b*. Word 526 also includes Y number of EDC symbols SYM[0:Y−1] 526*d* to protect the additional EDC symbols SYM[4:7] 521*d*-522*d* (and any additional metadata, if present, in word 526). "Y" is a number selected to provide the desired error resiliency for word 526 and may vary and/or be configured by region.

System node 550, memory node 510, and additional nodes 553 are operatively coupled to fabric 552. System node 550, memory node 510, and additional nodes 553 are operatively coupled to fabric 552 to communicate and/or exchange information etc. with each other. Fabric 552 may be or comprise a switched fabric, point-to-point connections, and/or other interconnect architectures (e.g., ring topologies, crossbars, etc.). Fabric 552 may include links, linking, and/or protocols that are configured to be cache coherent. For example, fabric 552 may use links, linking, and/or protocols that include functionality described by and/or are compatible with one or more of Compute Express Link (CXL), Coherent Accelerator Processor Interface (CAPI), and Gen-Z standards, or the like. In an embodiment, system node 550, memory node 510, and additional nodes 553 are operatively coupled to fabric 552 to request and/or store information from/to that resides within other of system node 550, memory node 510, and/or additional nodes 553. In an embodiment, additional nodes 553 may include similar or the same elements as system node 550, and/or memory node 510 and are therefore, for the sake of brevity, not discussed further herein with reference to FIG. 5.

In an embodiment, buffer device 511 includes error detection and correction (EDC) circuitry 512 (hereinafter, "EDC circuitry 512"), access circuitry 513, control circuitry 514, and cryptographic circuitry 516. Control circuitry 514 may include configuration information 515. Access circuitry 513 is operatively coupled to memory devices 520. Access circuitry 513 is configured to access at least one of memory devices 520 to access at least words 521-526 stored by memory devices 520. In an embodiment, buffer device 511 may be, or comprise, a processor running a real-time operating system.

Memory node 510 (and buffer device 511, in particular) is operatively coupled to fabric 552 to receive, from system node 550, access requests (e.g., reads and writes). Access requests transmitted by system node 550 may include read requests (e.g., to read a block of data comprising a cache line data 521a and associated metadata 521b) and write requests (e.g., to write a block of data comprising a cache line data 521a and associated metadata 521b). In an embodiment, to respond to a read or write request, buffer device 511 may perform a page table walk to relate the address received from system node 550 to a physical address that is used by memory devices 520 (e.g., to address words in one of region A 529a or region B 529b).

Buffer 510 and memory devices 520 may be, or comprise, integrated circuit type devices, such as those commonly referred to as "chips". A memory buffer, such as buffer 511, manages the flow of data going to and from memory devices 520 and fabric 552. Functionality of buffer 511 may be included on a single die, multiple dies, or included as part of a more complex integrated circuit system as a block of a system on a chip (SOC).

In an embodiment, when writing a cache line and associated metadata to memory devices 520, buffer 511 (and EDC circuitry 512, in particular) calculates a set of check symbols in order to provide a specified level of protection. Buffer 511 (and cryptographic circuitry 516, in particular) also cryptographically calculates a cryptographic signature (i.e., MAC) based on the cache line data and the metadata to help determine if the contents of the cache line data and/or the metadata have been tampered with. Buffer 511 writes a first portion (i.e., not all) of the generated check symbols (e.g., check symbols SYM[0:5] 521c), the cache line (e.g., cache line data 521a), associated metadata (e.g., metadata 521b), and a message authentication code (e.g., MAC 521e) concurrently to memory devices 520 at a first address (e.g., word 521). Thus, the first portion of the generated check symbols (e.g., check symbols SYM[0:5] 521c), the metadata (e.g., metadata 521b), the message authentication code (e.g., MAC 521e) and the cache line sized block of data (e.g., cache line data 521a) are all written concurrently at a first address. In other words, the first portion of the check symbols, the metadata, and the MAC are stored "side-band" relative to the cache line. Buffer 511 writes the remaining (second) portion of the generated check symbols (e.g., check symbols SYM[6:7] 521d) using a second command and at a second, different from the first, address. Thus, the second portion of the check symbols (and possibly additional metadata) is termed as being stored "in-band" (i.e., at a different address than the associated cache line.)

In an embodiment, when reading the block of data, buffer 511 issues a first read command to memory devices 520 that accesses the cache line (e.g., cache line data 521a), the first portion (e.g., check symbols SYM[0:5]) of the full set of check symbols, the metadata (e.g., metadata 521b), and the MAC (e.g., MAC 521e) stored side-band. Only the first portion (e.g., check symbols SYM[0:5] 521c) of the check symbols is used to determine a first number of errors (if any) in the accessed word (e.g., word 521). If the first number of errors equals or exceeds a threshold, buffer device 511 issues a second read command to access the second portion (e.g., check symbols SYM[6:7] 523a) of the check symbols stored in-band. After receiving the second portion of the check symbols, buffer device 511 uses the full set of EDC symbols (e.g., eight check symbols SYM[0:7]) to correct and/or detect errors.

If the first number of errors does not meet the threshold, buffer device 511 uses cryptograph circuitry 516 to determine whether the cache line data, metadata, and MAC meet an authentication criteria (e.g., MAC is equal to an expected value cryptographically calculated using, for example, a secret key, the cache line address, the cache line data, and the metadata). If the MAC, cache line data, and metadata collectively do not meet the authentication criteria, buffer device 511 issues a second read command to access the second portion (e.g., check symbols SYM[6:7] 521d) of the check symbols. After receiving the second portion of the check symbols, buffer device 511 uses the full set of EDC symbols (e.g., eight check symbols SYM[0:7]) to correct and/or detect errors in the cache line data, the metadata, and the MAC.

In an embodiment, the number of check symbols in the first and second portions and the size of the metadata written and read by buffer 511, and the size of the MAC are configurable (e.g., by using configuration information 515) by memory region 529a-529b. This is illustrated in FIG. 5 by words 524-525 in region B 529b having a different number of check symbols (e.g., check symbols SYM[0:6] 524c) than words 521-522 in region A 529a. This configurability allows different processes, system nodes, and/or virtual machines to use different metadata sizes have different amounts of EDC protection, and/or have different amounts of MAC protections.

In an embodiment, the number of symbols in the first and second proper subsets, the size of the block of metadata, the size of the MAC, and the threshold number of errors that result in a second access to retrieve the second proper subset of check symbols are configurable (e.g., using configuration information 515). Table 2 illustrates examples of configurations for a system (or region 529a-529b) using 16-bit symbols and a 640-bit word (i.e., 8 side-band cache line symbols).

TABLE 2

| EDC scheme | Meta-data size | Number of side-band (1$^{st}$ subset) EDC symbols | Errors present threshold | Side-band only EDC (1$^{st}$ subset) un-detectable error probability estimate | MAC size | MAC un-detected error probability estimate | Combined Side-band & MAC un-detected error probability estimate |
|---|---|---|---|---|---|---|---|
| RS | 0- | 8 | n/a | ~$10^{-15}$ | n/a | n/a | n/a |

TABLE 2-continued

| EDC scheme | Meta-data size | Number of side-band (1st subset) EDC symbols | Errors present threshold | Side-band only EDC (1st subset) undetectable error probability estimate | MAC size | MAC undetected error probability estimate | Combined Side-band & MAC undetected error probability estimate |
|---|---|---|---|---|---|---|---|
| (40, 32) RS (42, 34) | 32-bits | 6 | 2 symbols detected and corrected | $\sim 10^{-15}$ | 30-bits | $\sim 10^{-10}$ | $\sim 10^{-19}$ |
| RS (44, 36) | 64-bits | 4 | 1 symbol detected and corrected | $\sim 10^{-7}$ | 62-bits | $\sim 10^{-19}$ | $\sim 10^{-26}$ |

It should be understood from the foregoing that, in an embodiment, the MAC may be used as a means of authenticating data written to memory devices 520 that does not cover EDC check symbols. EDC check symbols are used to correct the errors on the cache line data and metadata (including the MAC). The MAC may be, for example, calculated (e.g., in parallel with decryption of the data on a read operation) by calculating a hash using a secret key for that region of memory (e.g., region 529a), the cache line data (e.g., cache line data 521a), the metadata (e.g., metadata 521b—without the MAC), and the address. In an embodiment, the address used in the MAC calculation is a device physical address (DPA) rather than a host physical address (HPA)—which is the host's (e.g., system node 550) addressing scheme. DPAs are used by buffer 511 in calculating MACs because those are the addresses buffer 511 uses to access memory devices 520. MAC values may therefore be calculated, for example, on-the-fly during a read operation using the cache line data, the metadata stored in memory devices 520, the DPA, and the secret key. If the calculated MAC value and the MAC value read from memory devices 520 match, the cache line data, the metadata stored in memory devices 520 has a very high likelihood (based on the length of the MAC) of being correct and not manipulated.

FIG. 6 is a flowchart illustrating a method of operating a memory system that stores authentication codes. One or more steps illustrated in FIG. 6 may be performed by, for example, system 500 and/or its components. Via a memory channel interface and from at least a first memory component, a first cache line of data, a first block of metadata, a first authentication code, and a first set of check symbols are concurrently received in response to a first read command transmitted by a memory buffer device (602). For example, memory buffer device 511 may concurrently receive and from memory devices 520 and via a memory channel interface of buffer 511, cache line data 521a, metadata 521b, MAC 521e, and check symbols SYM[0:5] 521c in response to a read command addressed to word 521 transmitted by buffer 511.

A first number of errors present in the first cache line of data, first block of metadata, and the first set of check symbols is determined (604). For example, using just check symbols SYM[0:5] 521c EDC circuitry 112 may determine how many, if any, errors are present in the cache line data 521a, metadata 521b, MAC 521e, and check symbols SYM[0:5] 521c received in response to the read command addressed to word 521. Based on the first number of errors not meeting a first threshold number, it is determined whether the authentication code and the first cache line of data meet an authentication criteria (606). For example, based on the number of errors present in the cache line data 521a, metadata 521b, MAC 521e, and check symbols SYM[0:5] 521c not meeting a threshold (e.g., two or more errors corrected, etc.) number of errors, buffer 511 (and cryptographic circuitry 516, in particular) uses MAC 521e as an additional check on whether cache line data 521a, metadata 521b, MAC 521e, and/or check symbols SYM[0:5] 521c may have errors that were not detected using check symbols SYM[0:5] 521c.

Based on the authentication code and the cache line of data not meeting the authentication criteria and by the memory buffer device, a second read command is transmitted to at least the first memory component (608). For example, based on cache line data 521a and metadata 521b, not meeting the authentication criteria (e.g., MAC 521e is not equal to an expected value cryptographically calculated using the cache line data 521a and metadata 521b), a second read command is transmitted to memory devices 520 in order to read word 523 where check symbols SYM[6:7] 521d are stored.

In response to the second read command, a second set of check symbols are received (610). For example, in response to the read of word 523, buffer 511 may receive check symbols SYM[6:7] 521d. Using at least the second set of check symbols, errors present in the first cache line of data, the first block of metadata, the first MAC, the first set of check symbols, and the second set of check symbols are corrected (612). For example, using check symbols SYM[6:7] 521d and check symbols SYM[0:5] 521c, EDC circuitry 512 may correct one or more errors present in one or more of cache line data 521a, metadata 521b, MAC 521e, check symbols SYM[0:5] 521c, and check symbols SYM[6:7] 521d.

Figure 7:
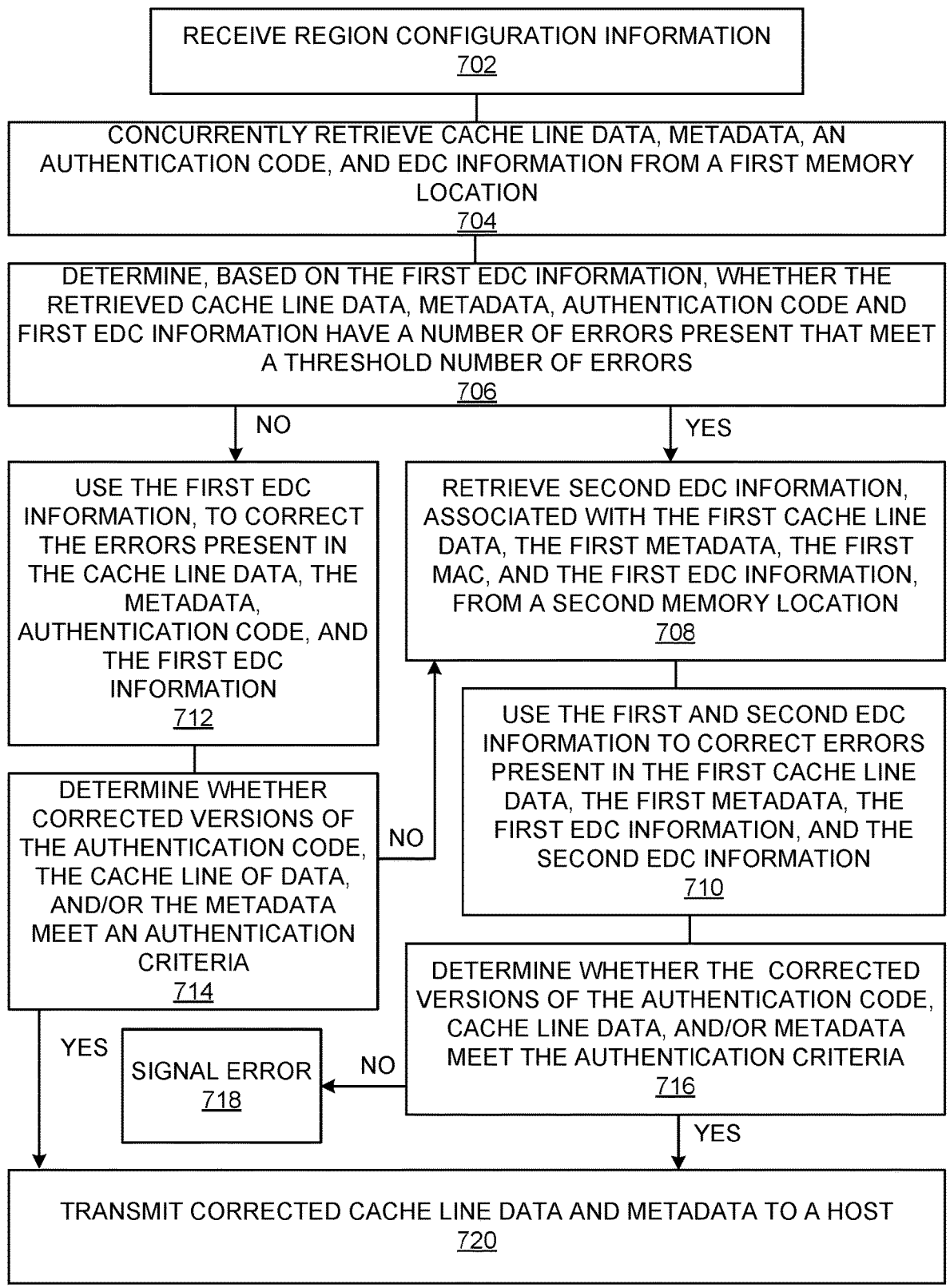
FIG. 7 is a flowchart illustrating a method of detecting errors using authentication codes.

FIG. 7 is a flowchart illustrating a method of detecting errors using authentication codes. One or more steps illustrated in FIG. 7 may be performed by, for example, system 500 and/or its components. Region configuration information is received (702). For example, system node 550 may configure configuration information 515 of buffer 511 so that region A 529a has six side-band check symbols (e.g., check symbols SYM[0:5] 521c), a 30-bit MAC (e.g., MAC 521e), and 2-bits of metadata (e.g., metadata 521b) and region B 529b has four side-band check symbols (e.g., check symbols SYM[0:3] 524c), a 62-bit MAC, (e.g., MAC 524e) and 2-bits of metadata (e.g., metadata 524b). See Table 5 for other example side-band/in-band region configurations.

Concurrently retrieve cache line data, metadata, MAC, and first EDC information from a first memory location (704). For example, buffer 511 may use access circuitry 513 to retrieve cache line data 521a, metadata 521b, MAC 521e, and check symbols SYM[0:5] 521c from word 521. Based on the first EDC information, determine whether the retrieved cache line data, metadata, MAC, and first EDC information have a number of errors present that meet or exceed a threshold number of errors. If the number of errors meets the threshold, flow proceeds to box 708. If the number of errors does not meet the threshold, flow proceeds to box 712 (706). For example, buffer 511, using EDC circuitry 512, may determine whether the retrieved versions of cache line data 521*a*, metadata 521*b*, MAC 521*e*, and check symbols SYM[0:5] 521*c* have a number of errors that meets a configured threshold number of errors (e.g., three or more symbols corrected).

In box 708, second EDC information associated with the cache line data, metadata, MAC, and the EDC information is retrieved from a second memory location (708). For example, if the retrieved versions of cache line data 521*a*, metadata 521*b*, and check symbols SYM[0:5] 521*c* meets the configured threshold number of errors, buffer 511 may retrieve word 523 in order to receive check symbols SYM[6:7] 521*d* that are associated with cache line data 521*a*, metadata 521*b*, MAC 521*e*, and check symbols SYM[0:5] 521*c*.

The first and second EDC information is used to correct errors present in the cache line data, metadata, MAC, the first EDC information, and the second EDC information (710). For example, EDC circuitry 512 may use check symbols SYM[0:5] 521*c* and check symbols SYM[6:7] 521*d* to correct one or more errors present in one or more of cache line data 521*a*, metadata 521*b*, MAC 521*e*, check symbols SYM[0:5] 521*c*, and check symbols SYM[6:7] 521*c*. It is determined whether the corrected versions of the authentication code, cache line data, and/or metadata meet the authentication criteria. If the authentication criteria is met, flow proceeds to box 720. If the authentication criteria is not met, flow proceeds to box 718 (716). In box 718, an error is reported (e.g., to system node 550). For example, buffer 511 may determine, based on corrected versions of cache line data 520*a*, metadata 520*b*, and/or MAC 521*e*, whether the corrected versions of cache line data 520*a*, metadata 520*b*, and/or MAC 521*e* meet the authentication criteria (e.g., MAC 521*e* is or is not equal to an expected value cryptographically calculated from the cache line data 521*a* and metadata 521*b*). If the authentication criteria is not collectively met by corrected versions of cache line data 520*a*, metadata 520*b*, and/or MAC 521*e*, buffer 511 may report an error to system node 550.

In box 720, the corrected cache line data and metadata is transmitted to a host (720). For example, after determining that the corrected versions of cache line data 521*a*, metadata 521*b*, and/or MAC 521*e* meet the authentication criteria, buffer 511 may transmit the corrected versions of cache line data 521*a* and metadata 521*b* to system node 550.

In box 712, the first EDC information is used to correct errors present in the cache line data, metadata, MAC, and the first EDC information (712). For example, if the retrieved versions of cache line data 521*a*, metadata 521*b*, MAC 521*e*, and check symbols SYM[0:5] 521*c* did not meet the configured threshold number of errors, EDC circuitry 512 may use just check symbols SYM[0:5] 521*c* to correct one or more errors present in one or more of cache line data 521*a*, metadata 521*b*, MAC 521*e*, and check symbols SYM[0:5] 521*c*. Flow then proceeds to box 714.

It is determined whether the corrected versions of the authentication code, cache line data, and/or metadata meet the authentication criteria. If the authentication criteria is met, flow proceeds to box 720. If the authentication criteria is not met, flow proceeds to box 708 (714). For example, buffer 511 may determine, based on corrected versions of cache line data 521*a*, metadata 521*b*, and/or MAC 521*e*, whether the corrected versions of cache line data 521*a*, metadata 521*b*, and/or MAC 521*e* meet the authentication criteria (e.g., MAC 521*e* is or is not equal to an expected value cryptographically calculated using the cache line data 521*a* and metadata 521*b*). If the authentication criteria is not collectively met by corrected versions of cache line data 521*a*, metadata 521*b*, and/or MAC 521*e*, buffer 511 may retrieve check symbols SYM[6:7] 521*d* from word 523 and attempt to correct errors present in cache line data 521*a*, metadata 521*b*, and/or MAC 521*e* using check symbols SYM[6:7] 521*d*.

Figure 8:
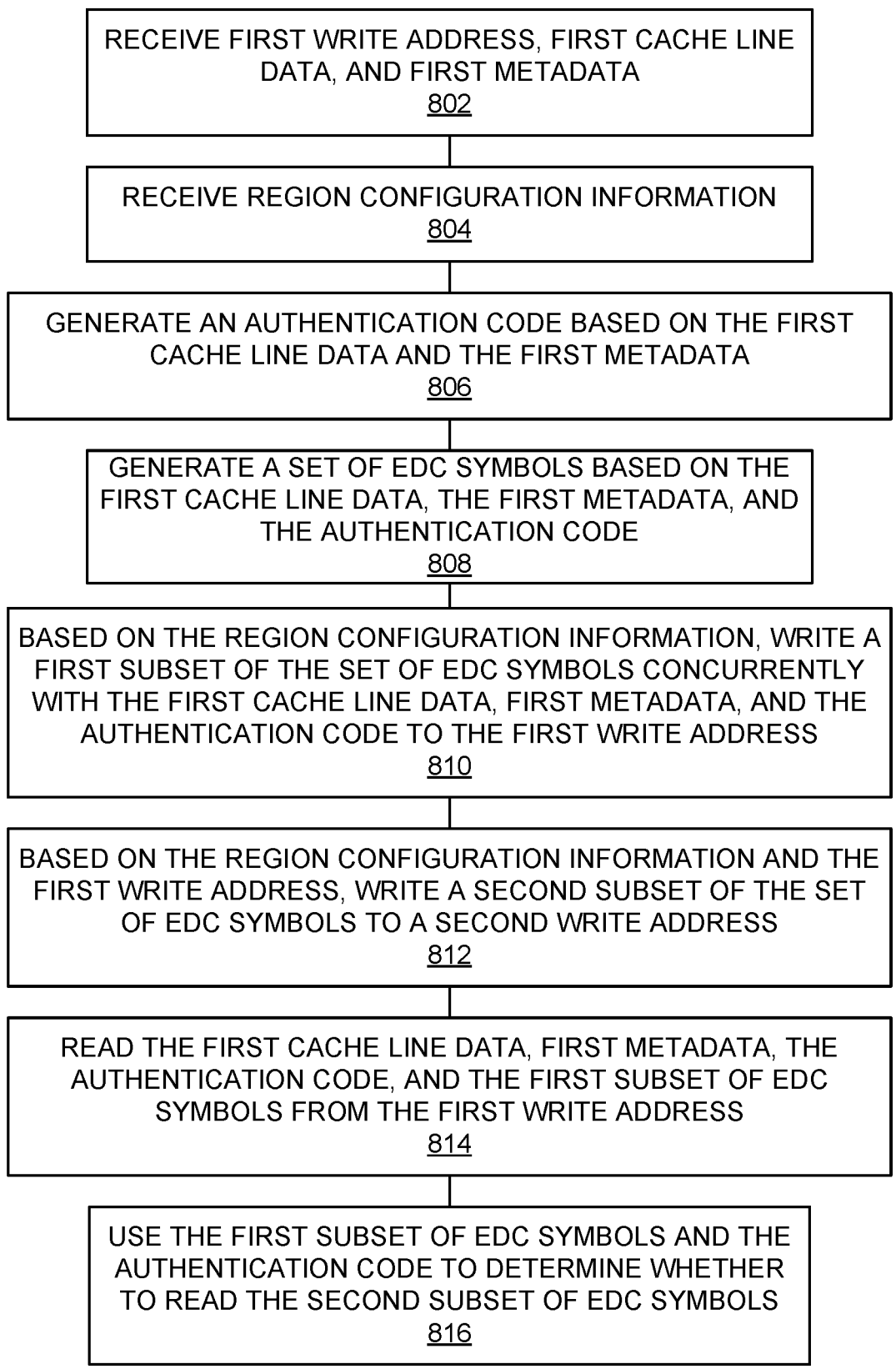
FIG. 8 is a flowchart illustrating a method of reading and writing error detection information and authentication codes.

FIG. 8 is a flowchart illustrating a method of reading and writing error detection information and authentication codes. One or more steps illustrated in FIG. 8 may be performed by, for example, system 500 and/or its components. A first write address, first cache line data, and first metadata are received (802). For example, buffer 511 may receive, from system node 550, cache line data 521*a* in association with metadata 521*b* to be written to word 521.

Region configuration information is received (504). For example, system node 550 may configure configuration information 515 of buffer 511 so that region A 529*a* has six side-band check symbols (e.g., check symbols SYM[0:5] 520*c*), a 30-bit MAC (e.g., MAC 521*e*), and 2-bits of metadata (e.g., metadata 520*b*) and region B 529*b* has four side-band check symbols (e.g., check symbols SYM[0:3] 524*c*), a 62-bit MAC, (e.g., MAC 524*e*) and 2-bits of metadata (e.g., metadata 524*b*). See Table 5 for other example side-band/in-band region configurations.

An authentication code is generated based on the first cache line data and the first metadata (806). For example, buffer 511 (and cryptographic circuitry 516, in particular) may cryptographically calculate MAC 521*e* based on cache line data 521*a* and metadata 521*b*. A set of EDC symbols based on the first cache line data, the first metadata, and the authentication code is generated (808). For example, EDC circuitry 512 may, based on cache line data 521*a*, metadata 521*b*, and MAC 521*e* generate check symbols SYM[0:5] 521*c* and check symbols SYM[6:7] 521*d*.

Based on the region configuration information, a first subset of the set of EDC symbols is written concurrently with the first cache line data, first metadata, and first authentication code to the first write address (810). For example, based on the information that region A 529*a* is to have six check symbols side-band, a 30-bit authentication code, and 2-bits of metadata (also side-band), buffer 511 (and access circuitry 513, in particular) may concurrently write cache line data 521*a*, metadata 521*b*, MAC 521*e*, and check symbols SYM[0:5] 521*c* to word 521. Based on the region configuration information and the first write address, a second subset of the set of EDC symbols is written to a second write address (812). For example, based on the information that region A 829*a* is to six check symbols side-band, a 30-bit authentication code, and 2-bits of metadata (also side-band), configuration information that indicates word 523 is to store check symbols SYM[6:7], with the write address of word 521 indicating the location of check symbols SYM[6:7] 521*d* in word 523, buffer 511 may write check symbols SYM[6:7] 521*d* to a location in word 523.

The first cache line data, first metadata, authentication code, and first subset of EDC symbols is read from the first write address (814). For example, in response to a read transaction from system node 550, buffer 511 may read word 521 to receive cache line data 521*a*, metadata 521*b*, MAC 521*e*, and check symbols SYM[0:5] 521*c*. The first subset of EDC symbols and the authentication code are used to determine whether to read the second subset of EDC symbols (816). For example, buffer 511, using EDC circuitry 512, may determine whether the retrieved versions of cache line data 521*a*, metadata 521*b*, and check symbols SYM[0:5] 521*c* have enough errors (e.g., meet a threshold) to warrant retrieving check symbols SYM[6:7] 521*d* from word 523 and also determine whether cache line data 521*a*, metadata 521*b*, and MAC 521*e* meet an authentication criteria and, if not, warrant retrieving check symbols SYM [6:7] 521*d* from word 523.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of memory system 100, and/or memory system 500, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 9:
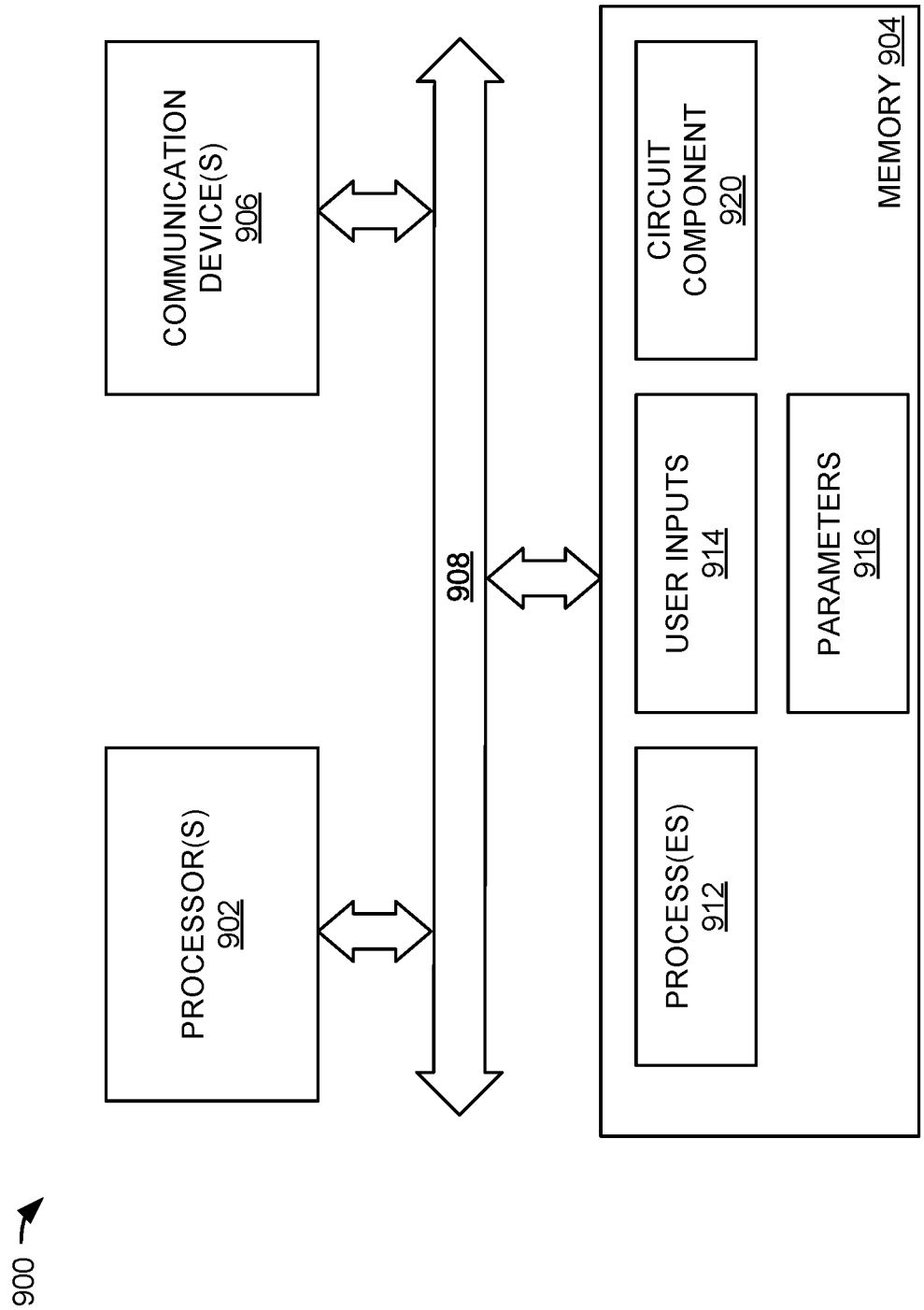
FIG. 9 is a block diagram of a processing system.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of memory system 100, and/or memory system 500, and their components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: A memory buffer device, comprising: error detection and correction circuitry to generate a first set of check symbols for a first block of data and a first block of metadata, the first set of check symbols including a first proper subset of the first set of check symbols and a second proper subset of the first set of check symbols; a first memory channel interface to concurrently access, from at least a first memory component, the first block of data, the first proper subset, and the first block of metadata, to receive a received version of the first block of data, a received version of the first proper subset, and a received version of the first block of metadata; the error detection and correction circuitry to use the received version of the first proper subset to detect a first number of errors in the received version of the first block of data, the received version of the first proper subset, and the received version of the first block of metadata; based on the first number of errors meeting a first threshold criteria, the first memory channel interface to access the second proper subset at a second address to receive a received version of the second proper subset; and based on the first number of errors meeting the first threshold criteria, the error detection and correction circuitry to use the received version of the first proper subset and the received version of the second proper subset to detect a second number of errors in the received version of the first block of data, the received version of the first proper subset, the received version of the second proper subset, and the received version of the first block of metadata.

Example 2: The memory buffer device of example 1, wherein, the first proper subset is configurable, based on a region of memory being accessed, to consist of at least a first number of symbols and a second number of symbols, where the first number of symbols and the second number of symbols are not equal.

Example 3: The memory buffer device of example 1, wherein the first block of metadata comprises a first message authentication code (MAC), the received version of the first block of metadata comprises a received version of the first MAC, and the memory buffer device further comprises: MAC circuitry to, based on first number of errors not meeting the first threshold criteria, determine whether the received version of the first MAC meets an authentication criteria; based on the received version of the first MAC not meeting the authentication criteria, the first memory channel interface to access the second proper subset to receive the received version of the second proper subset; and based on the received version of the first MAC not meeting the authentication criteria, the error detection and correction circuitry to use the received version of the first proper subset and the received version of the second proper subset to detect a second number of errors in the received version of the first block of data, the received version of the first proper subset, the received version of the second proper subset, and the received version of the first block of metadata.

Example 4: The memory buffer device of example 3, wherein, the first MAC is configurable, based on a region of memory being accessed, to consist of at least a first number of bits and a second number of bits, where the first number of bits and the second number of bits are not equal.

Example 5: The memory buffer device of example 1, further comprising: configuration circuitry to determine a first number of check symbols in the first proper subset.

Example 6: The memory buffer device of example 5, wherein the configuration circuitry is to further determine a second number of check symbols in the first set of check symbols.

Example 7: The memory buffer device of example 6, wherein the configuration circuitry is to further, based on the first number of check symbols and the second number of check symbols, determine the first threshold criteria.

Example 8: A memory buffer device, comprising: a memory channel interface to concurrently receive, based on a first command transmitted by the memory buffer device and from at least a first memory component, a first cache line of data, a first block of metadata, and a first set of check symbols; error detection and correction circuitry to use the first set of check symbols to determine a first number of errors present in the first cache line of data, the first block of metadata, and the first set of check symbols; and control circuitry to, based on the first number of errors meeting a first threshold number of errors, control the memory channel interface to, based on a second command transmitted by the memory buffer device and from at least the first memory component, receive a second set of check symbols, and to control the error detection and correction circuitry to use the first set of check symbols and the second set of check symbols to correct errors present in the first cache line of data, the first block of metadata, the first set of check symbols, and the second set of check symbols.

Example 9: The memory buffer device of example 8, wherein: the memory channel interface is to further concurrently receive, based on a third command transmitted by the memory buffer device and from at least the first memory component, a second cache line of data, a second block of metadata, and a third set of check symbols; the error detection and correction circuitry is to further use the third set of check symbols to determine a second number of errors present in the second cache line of data, the second block of metadata, and the third set of check symbols; and the control circuitry is to, based on the second number of errors meeting a second threshold number of errors, control the memory channel interface to, based on a fourth command transmitted by the memory buffer device and from at least the first memory component, receive a fourth set of check symbols, and is to control the error detection and correction circuitry to use the third set of check symbols and the fourth set of check symbols to correct errors present in the second cache line of data, the second block of metadata, the third set of check symbols, and the fourth set of check symbols.

Example 10: The memory buffer device of example 9, wherein the first number of errors and the second number of errors are based on configuration information accessed via the memory channel interface.

Example 11: The memory buffer device of example 9, wherein the first number of errors and the second number of errors are not equal.

Example 12: The memory buffer device of example 9, wherein the first number of errors is based at least in part on a first number of check symbols in the first set of check symbols and a first number of data symbols in the first cache line, and wherein the second number of errors is based at least in part on a second number of check symbols in the second set of check symbols and a second number of data symbols in the second cache line.

Example 13: The memory buffer device of example 8, further comprising: authentication code circuitry, wherein: the memory channel interface is to further concurrently receive, based on a third command transmitted by the memory buffer device and from at least the first memory component, a second cache line of data, a second block of metadata, and a third set of check symbols, the second block of metadata comprising an authentication code that is based on the second cache line of data; the error detection and correction circuitry is to further use the third set of check symbols to determine a second number of errors present in the second cache line of data, the second block of metadata, and the third set of check symbols; the authentication code circuitry to determine whether the authentication code and the second cache line of data meet an authentication criteria; and the control circuitry to, based on the authentication code and the second cache line of data meet not meeting the authentication criteria, control the memory channel interface to, based on a fourth command transmitted by the memory buffer device and from at least the first memory component, receive a fourth set of check symbols, and to control the error detection and correction circuitry to use the third set of check symbols and the fourth set of check symbols to correct errors present in the second cache line of data, the second block of metadata, the third set of check symbols, and the fourth set of check symbols.

Example 14: The memory buffer device of example 13, wherein the first number of errors is based at least in part on a first number of check symbols in the first set of check symbols and a first number of data symbols in the first cache line.

Example 15: A method of operating a memory buffer device, comprising: concurrently receiving, via a memory channel interface and from at least a first memory component, a first cache line of data, a first block of metadata, and a first set of check symbols in response to a first read command transmitted by the memory buffer device; determining a first number of errors present in the first cache line of data, the first block of metadata, and the first set of check symbols; and based on the first number of errors meeting a first threshold number, transmitting, by the memory buffer device, a second read command to at least the first memory component; receiving, in response to the second read command, a second set of check symbols; and correcting, using at least the second set of check symbols, errors present in the first cache line of data, the first block of metadata, the first set of check symbols, and the second set of check symbols.

Example 16: The method of example 15, further comprising: transmitting, by the memory buffer device, a third read command to at least the first memory component;

concurrently receiving, in response to the third read command and from at least the first memory component, a second cache line of data, a second block of metadata, and a third set of check symbols; determining a second number of errors present in the second cache line of data, the second block of metadata, and the second set of check symbols; based on the second number of errors meeting a second threshold number, transmitting, by the memory buffer device, a fourth read command to at least the first memory component; receiving, in response to the fourth read command, a fourth set of check symbols; and correcting, using at least the fourth set of check symbols, errors present in the second cache line of data, the second block of metadata, the third set of check symbols, and the fourth set of check symbols.

Example 17: The method of example 16, further comprising: receiving a first indicator of the first number of errors; and receiving a second indicator of the second number of errors.

Example 18: The method of example 16, wherein the first number of errors and the second number of errors are not equal.

Example 19: The method of example 16, wherein the first number of errors is based at least in part on a first number of check symbols in the first set of check symbols and a first number of data symbols in the first cache line, and wherein the second number of errors is based at least in part on a second number of check symbols in the second set of check symbols and a second number of data symbols in the second cache line.

Example 20: The method of example 15, further comprising: transmitting, by the memory buffer device, a third read command to at least the first memory component; concurrently receiving, in response to the third read command and from at least the first memory component, a second cache line of data, a second block of metadata, and a third set of check symbols, the second block of metadata comprising an authentication code based on the second cache line of data; determining a second number of errors present in the second cache line of data, the second block of metadata, and the second set of check symbols; based on the second number of errors not meeting a second threshold number, determining whether the authentication code and the second cache line of data meet an authentication criteria; based on the authentication code and the second cache line of data not meeting the authentication criteria, transmitting, by the memory buffer device, a fourth read command to at least the first memory component; receiving, in response to the fourth read command, a fourth set of check symbols; and correcting, using at least the fourth set of check symbols, errors present in the second cache line of data, the second block of metadata, the third set of check symbols, and the fourth set of check symbols.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory buffer device, comprising:
   error detection and correction circuitry to generate a first set of check symbols for a first block of data and a first block of metadata, the first set of check symbols including a first proper subset of the first set of check symbols and a second proper subset of the first set of check symbols;
   a first memory channel interface to concurrently access, at a first address and from at least a first memory component, the first block of data, the first proper subset, and the first block of metadata, to receive a received version of the first block of data, a received version of the first proper subset, and a received version of the first block of metadata;
   the error detection and correction circuitry to use the received version of the first proper subset to detect a first number of errors in the received version of the first block of data, the received version of the first proper subset, and the received version of the first block of metadata;
   based on the first number of errors meeting a first threshold criteria, the first memory channel interface to access the second proper subset at a second address to receive a received version of the second proper subset; and
   based on the first number of errors meeting the first threshold criteria, the error detection and correction circuitry to use the received version of the first proper subset and the received version of the second proper subset to detect a second number of errors in the received version of the first block of data, the received version of the first proper subset, the received version of the second proper subset, and the received version of the first block of metadata.

2. The memory buffer device of claim 1, wherein, the first proper subset is configurable, based on a region of memory being accessed, to consist of at least a first number of symbols and a second number of symbols, where the first number of symbols and the second number of symbols are not equal.

3. The memory buffer device of claim 1, wherein the first block of metadata comprises a first message authentication code (MAC), the received version of the first block of metadata comprises a received version of the first MAC, and the memory buffer device further comprises:
   MAC circuitry to, based on first number of errors not meeting the first threshold criteria, determine whether the received version of the first MAC meets an authentication criteria;
   based on the received version of the first MAC not meeting the authentication criteria, the first memory channel interface to access the second proper subset to receive the received version of the second proper subset; and
   based on the received version of the first MAC not meeting the authentication criteria, the error detection and correction circuitry to use the received version of the first proper subset and the received version of the second proper subset to detect a second number of errors in the received version of the first block of data, the received version of the first proper subset, the received version of the second proper subset, and the received version of the first block of metadata.

4. The memory buffer device of claim 3, wherein, the first MAC is configurable, based on a region of memory being accessed, to consist of at least a first number of bits and a second number of bits, where the first number of bits and the second number of bits are not equal.

5. The memory buffer device of claim 1, further comprising:
   configuration circuitry to determine a first number of check symbols in the first proper sub set.

6. The memory buffer device of claim 5, wherein the configuration circuitry is to further determine a second number of check symbols in the first set of check symbols.

7. The memory buffer device of claim 6, wherein the configuration circuitry is to further, based on the first number of check symbols and the second number of check symbols, determine the first threshold criteria.

8. A memory buffer device, comprising:
   a memory channel interface to concurrently receive, based on a first command transmitted by the memory buffer device and from at least a first memory component, a first cache line of data, a first block of metadata, and a first set of check symbols;
   error detection and correction circuitry to use the first set of check symbols to determine a first number of errors present in the first cache line of data, the first block of metadata, and the first set of check symbols; and
   control circuitry to, based on the first number of errors meeting a first threshold number of errors, control the memory channel interface to, based on a second command transmitted by the memory buffer device and from at least the first memory component, receive a second set of check symbols, and to control the error detection and correction circuitry to use the first set of check symbols and the second set of check symbols to correct errors present in the first cache line of data, the first block of metadata, the first set of check symbols, and the second set of check symbols.

9. The memory buffer device of claim 8, wherein:
   the memory channel interface is to further concurrently receive, based on a third command transmitted by the memory buffer device and from at least the first memory component, a second cache line of data, a second block of metadata, and a third set of check symbols;
   the error detection and correction circuitry is to further use the third set of check symbols to determine a second number of errors present in the second cache line of data, the second block of metadata, and the third set of check symbols; and
   the control circuitry is to, based on the second number of errors meeting a second threshold number of errors, control the memory channel interface to, based on a fourth command transmitted by the memory buffer device and from at least the first memory component, receive a fourth set of check symbols, and is to control the error detection and correction circuitry to use the third set of check symbols and the fourth set of check symbols to correct errors present in the second cache line of data, the second block of metadata, the third set of check symbols, and the fourth set of check symbols.

10. The memory buffer device of claim 9, wherein the first number of errors and the second number of errors are based on configuration information accessed via the memory channel interface.

11. The memory buffer device of claim 9, wherein the first number of errors and the second number of errors are not equal.

12. The memory buffer device of claim 9, wherein the first number of errors is based at least in part on a first number of check symbols in the first set of check symbols and a first number of data symbols in the first cache line, and wherein the second number of errors is based at least in part on a second number of check symbols in the second set of check symbols and a second number of data symbols in the second cache line.

13. The memory buffer device of claim 8, further comprising:
   authentication code circuitry, wherein:
      the memory channel interface is to further concurrently receive, based on a third command transmitted by the memory buffer device and from at least the first memory component, a second cache line of data, a second block of metadata, and a third set of check symbols, the second block of metadata comprising an authentication code that is based on the second cache line of data;
      the error detection and correction circuitry is to further use the third set of check symbols to determine a second number of errors present in the second cache line of data, the second block of metadata, and the third set of check symbols;
      the authentication code circuitry to determine whether the authentication code and the second cache line of data meet an authentication criteria; and
      the control circuitry to, based on the authentication code and the second cache line of data meet not meeting the authentication criteria, control the memory channel interface to, based on a fourth command transmitted by the memory buffer device and from at least the first memory component, receive a fourth set of check symbols, and to control the error detection and correction circuitry to use the third set of check symbols and the fourth set of check symbols to correct errors present in the second cache line of data, the second block of metadata, the third set of check symbols, and the fourth set of check symbols.

14. The memory buffer device of claim 13, wherein the first number of errors is based at least in part on a first number of check symbols in the first set of check symbols and a first number of data symbols in the first cache line.

15. A method of operating a memory buffer device, comprising:
   concurrently receiving, via a memory channel interface and from at least a first memory component, a first cache line of data, a first block of metadata, and a first set of check symbols in response to a first read command transmitted by the memory buffer device;
   determining a first number of errors present in the first cache line of data, the first block of metadata, and the first set of check symbols; and
   based on the first number of errors meeting a first threshold number, transmitting, by the memory buffer device, a second read command to at least the first memory component;
   receiving, in response to the second read command, a second set of check symbols; and
   correcting, using at least the second set of check symbols, errors present in the first cache line of data, the first block of metadata, the first set of check symbols, and the second set of check symbols.

16. The method of claim 15, further comprising:
   transmitting, by the memory buffer device, a third read command to at least the first memory component;
   concurrently receiving, in response to the third read command and from at least the first memory component, a second cache line of data, a second block of metadata, and a third set of check symbols;

determining a second number of errors present in the second cache line of data, the second block of metadata, and the second set of check symbols;

based on the second number of errors meeting a second threshold number, transmitting, by the memory buffer device, a fourth read command to at least the first memory component;

receiving, in response to the fourth read command, a fourth set of check symbols; and correcting, using at least the fourth set of check symbols, errors present in the second cache line of data, the second block of metadata, the third set of check symbols, and the fourth set of check symbols.

17. The method of claim 16, further comprising:
receiving a first indicator of the first number of errors; and
receiving a second indicator of the second number of errors.

18. The method of claim 16, wherein the first number of errors and the second number of errors are not equal.

19. The method of claim 16, wherein the first number of errors is based at least in part on a first number of check symbols in the first set of check symbols and a first number of data symbols in the first cache line, and wherein the second number of errors is based at least in part on a second number of check symbols in the second set of check symbols and a second number of data symbols in the second cache line.

20. The method of claim 15, further comprising:
transmitting, by the memory buffer device, a third read command to at least the first memory component;

concurrently receiving, in response to the third read command and from at least the first memory component, a second cache line of data, a second block of metadata, and a third set of check symbols, the second block of metadata comprising an authentication code based on the second cache line of data;

determining a second number of errors present in the second cache line of data, the second block of metadata, and the second set of check symbols;

based on the second number of errors not meeting a second threshold number, determining whether the authentication code and the second cache line of data meet an authentication criteria;

based on the authentication code and the second cache line of data not meeting the authentication criteria, transmitting, by the memory buffer device, a fourth read command to at least the first memory component;

receiving, in response to the fourth read command, a fourth set of check symbols; and correcting, using at least the fourth set of check symbols, errors present in the second cache line of data, the second block of metadata, the third set of check symbols, and the fourth set of check symbols.

* * * * *